(12) United States Patent
Zhang et al.

(10) Patent No.: US 10,748,137 B2
(45) Date of Patent: Aug. 18, 2020

(54) METHODS, APPARATUS, AND STORAGE MEDIUM FOR DISPLAYING VIRTUAL CARDS

(71) Applicant: Beijing Xiaomi Mobile Software Co., Ltd., Beijing (CN)

(72) Inventors: Xu Zhang, Beijing (CN); Yu Cheng, Beijing (CN); Jing Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 593 days.

(21) Appl. No.: 15/628,208

(22) Filed: Jun. 20, 2017

(65) Prior Publication Data
US 2017/0372297 A1 Dec. 28, 2017

Related U.S. Application Data

(63) Continuation of application No. PCT/CN2016/086691, filed on Jun. 22, 2016.

(51) Int. Cl.
*G06F 3/0481* (2013.01)
*G06Q 20/22* (2012.01)
(Continued)

(52) U.S. Cl.
CPC ....... *G06Q 20/351* (2013.01); *G06F 3/04817* (2013.01); *G06Q 20/227* (2013.01); *G06Q 20/3278* (2013.01); *G06Q 20/382* (2013.01)

(58) Field of Classification Search
None
See application file for complete search history.

(56) References Cited

U.S. PATENT DOCUMENTS

2006/0000900 A1 1/2006 Fernandes et al.
2008/0126145 A1 5/2008 Rackley, III et al.
(Continued)

FOREIGN PATENT DOCUMENTS

CN 101276447 A 10/2008
CN 103500404 A 1/2014
(Continued)

OTHER PUBLICATIONS

European Patent Office, Extended European Search Report of European Patent Application No. 17177109.0, dated Aug. 21, 2017, 7 pages.

(Continued)

*Primary Examiner* — Jay Huang
*Assistant Examiner* — Gabriel Mercado
(74) *Attorney, Agent, or Firm* — Arch & Lake LLP

(57) ABSTRACT

Methods, apparatus, and storage mediums for displaying a virtual card are provided herein. In one aspect, a method includes acquiring card face display data of a virtual card to be displayed when receiving an interface display instruction, and generating a payment function identification for the virtual card according to a provisioning state of a payment function supported by the virtual card. The method also includes displaying the virtual card according to the card face display data and the payment function identification for the virtual card. In this disclosure, one or more virtual cards can be displayed intuitively according to different payment functions supported by the virtual cards and different provisioning states of the respective payment functions, so that all payment manners supported by the virtual cards are clearly displayed. Thus, a user can be helped and guided to apply for provisioning of corresponding payment functions conveniently.

20 Claims, 9 Drawing Sheets

(51) Int. Cl.
*G06Q 20/38* (2012.01)
*G06Q 20/34* (2012.01)
*G06Q 20/32* (2012.01)

(56) References Cited

U.S. PATENT DOCUMENTS

| | | |
|---|---|---|
| 2010/0076833 A1 | 3/2010 | Nelsen |
| 2013/0060686 A1 | 3/2013 | Mersky |
| 2013/0320080 A1* | 12/2013 | Olson .................. G07F 7/0833 235/380 |
| 2014/0244494 A1 | 8/2014 | Davis et al. |
| 2014/0244495 A1 | 8/2014 | Davis et al. |
| 2014/0244514 A1 | 8/2014 | Rodriguez et al. |
| 2014/0258110 A1 | 9/2014 | Davis et al. |
| 2014/0357312 A1 | 12/2014 | Davis et al. |
| 2015/0227922 A1 | 8/2015 | Filler |
| 2015/0227925 A1 | 8/2015 | Filler |
| 2015/0317529 A1 | 11/2015 | Zhou et al. |
| 2017/0337542 A1* | 11/2017 | Kim ....................... G06Q 20/10 |

FOREIGN PATENT DOCUMENTS

| | | |
|---|---|---|
| CN | 105046486 A | 11/2015 |
| CN | 105095900 A | 11/2015 |
| CN | 105190659 A | 12/2015 |
| CN | 105590214 A | 5/2016 |
| EP | 2 927 856 A1 | 10/2015 |

OTHER PUBLICATIONS

International Search Report and Written Opinion issued in corresponding International Application No. PCT/CN2016/086691, dated Mar. 1, 2017, 12 pages.

* cited by examiner

METHODS, APPARATUS, AND STORAGE MEDIUM FOR DISPLAYING VIRTUAL CARDS

CROSS-REFERENCE TO RELATED APPLICATION

This application is based on and claims the priority of the PCT patent application No. PCT/CN2016/086691, filed on Jun. 22, 2016, which is incorporated herein by reference in its entirety.

TECHNICAL FIELD

The present disclosure is related to the field of terminal technology, and more particularly to a virtual card displaying method and apparatus, and a storage medium.

BACKGROUND

With development of various terminal and device technologies, mobile payment have become widely accepted. Current mobile payment technologies may be divided into two major types in terms of payment business: third-party payment and Near Field Communication (NFC) flash payment. Third-party payment (namely, quick payment) refers to a payment manner in which third-party payment companies serve as settlement entities and act as media for transaction with banks. NFC flash payment refers to a payment manner in which bank union organizations serve as settlement entities and act as media for transaction with banks. Either of the above payment manners greatly simplifies users' payment process. In addition, as these payment manners substitute for physical bank cards and cash, safety of users' money is ensured.

SUMMARY

The present disclosure is directed intuitive display of virtual cards. Embodiments provided include a virtual card displaying method and apparatus, and a storage medium as below.

In a first aspect of the present disclosure, a method for displaying a virtual card is provided. The method includes acquiring card face display data of a virtual card to be displayed when receiving an interface display instruction; generating a payment function identification for the virtual card according to a provisioning state of a payment function supported by the virtual card; and displaying the virtual card according to the card face display data and the payment function identification for the virtual card.

According to a second aspect of the present disclosure, another method for displaying a virtual card displaying is provided. The method includes receiving first card type information of a first virtual card sent by a terminal, the first virtual card at least supporting a first payment function; inquiring whether a card face database stores first card face display data, wherein the card face database stores card face display data acquired during a process of provisioning a second payment function, and the first card face display data is card face display data corresponding to the first card type information; and sending the first card face display data to the terminal if the card face database stores the first card face display data, so that the terminal displays the first virtual card according to the first card face display data.

According to a third aspect of the present disclosure, an apparatus for displaying a virtual card is provided. The apparatus includes an acquiring module configured to acquire card face display data of a virtual card to be displayed when an interface display instruction is received; a generating module configured to generate a payment function identification for the virtual card according to a provisioning state of a payment function supported by the virtual card; and a displaying module configured to display the virtual card according to the card face display data and the payment function identification for the virtual card.

According to a fourth aspect of the present disclosure, another apparatus for displaying a virtual card is provided. The apparatus includes a receiving module configured to receive first card type information of a first virtual card sent by a terminal, the first virtual card at least supporting a first payment function; an inquiring module configured to inquire whether a card face database stores first card face display data, wherein the card face database stores card face display data acquired during a process of provisioning a second payment function, and the first card face display data is card face display data corresponding to the first card type information; and a sending module configured to send the first card face display data to the terminal if the card face database stores the first card face display data, so that the terminal displays the first virtual card according to the first card face display data.

According to a fifth aspect of the present disclosure, yet another apparatus for displaying a virtual card is provided. The apparatus includes a processor; and a memory configured to store instructions executable by the processor. The processor is configured to: acquire first card type information of a first virtual card which supports at least a first payment function; send the first card type information to a server, so that the server acquires and returns first card face display data, wherein a card face database stores card face display data acquired during a process of provisioning a second payment function, and the first card face display data is card face display data corresponding to the first card type information; receive the first card type information; and display the first virtual card according to the first card face display data.

According to a sixth aspect of the present disclosure, yet another apparatus for displaying a virtual card is provided. The apparatus includes a processor; and a memory configured to store instructions executable by the processor. The processor is configured to: receive first card type information of a first virtual card sent by a terminal, the first virtual card at least supporting a first payment function; inquire whether a card face database stores first card face display data, wherein the card face database stores card face display data acquired during a process of provisioning a second payment function, and the first card face display data is the card face display data corresponding to first card type information; and send the first card face display data to the terminal if the card face database stores the first card face display data, so that the terminal displays the first virtual card according to the first card face display data.

According to a seventh aspect of the present disclosure, a non-transitory computer-readable storage medium is provided having stored therein instructions that, when executed by a processor of a mobile terminal, causes the mobile terminal to perform a virtual card displaying method. The method includes acquiring card face display data of a virtual card to be displayed when receiving an interface display instruction; generating a payment function identification for the virtual card according to a provisioning state of a payment function supported by the virtual card; and displaying the virtual card according to the card face display data and the payment function identification for the virtual card.

It should be understood that both the foregoing general description and the following detailed description are only exemplary and explanatory and are not restrictive of the disclosure.

BRIEF DESCRIPTION OF THE DRAWINGS

The accompanying drawings herein which are incorporated into and constitute a part of the specification, illustrate the embodiments according to the present disclosure, and serve to explain the principles of the present disclosure together with the description.

DETAILED DESCRIPTION

In order to make objects, solutions and advantages of the present disclosure more apparent, embodiments of the present disclosure will be described in detail in conjunction with the accompanying drawings in the following. It should be understood that the embodiments described herein are used merely to illustrate and explain rather than to limit the present disclosure.

Payment functions as described herein may include third-party payment functions, Near Field Communication (NFC) flash payment functions, and the like. In particular, third-party payment functions may include a payment process in which a third-party payment agency with a payment license provides a payment account, and a user can recharge the payment account or link a bank card with the payment account. In this manner, a recipient terminal and a payment terminal can interact during the payment process using two-dimensional code scanning, for instance, or some other manner, enabling payment to be made from the payment account to the recipient account. On the other hand, NFC flash payment functions may include a payment manner in which payment information is exchanged between an NFC module on a payment terminal and another NFC module on a recipient terminal. The recipient terminal can then perform data interaction with a background providing the recipient terminal (such as a UnionPay server or a bank server) to complete the payment from the payment terminal to the recipient terminal.

Figure 1:
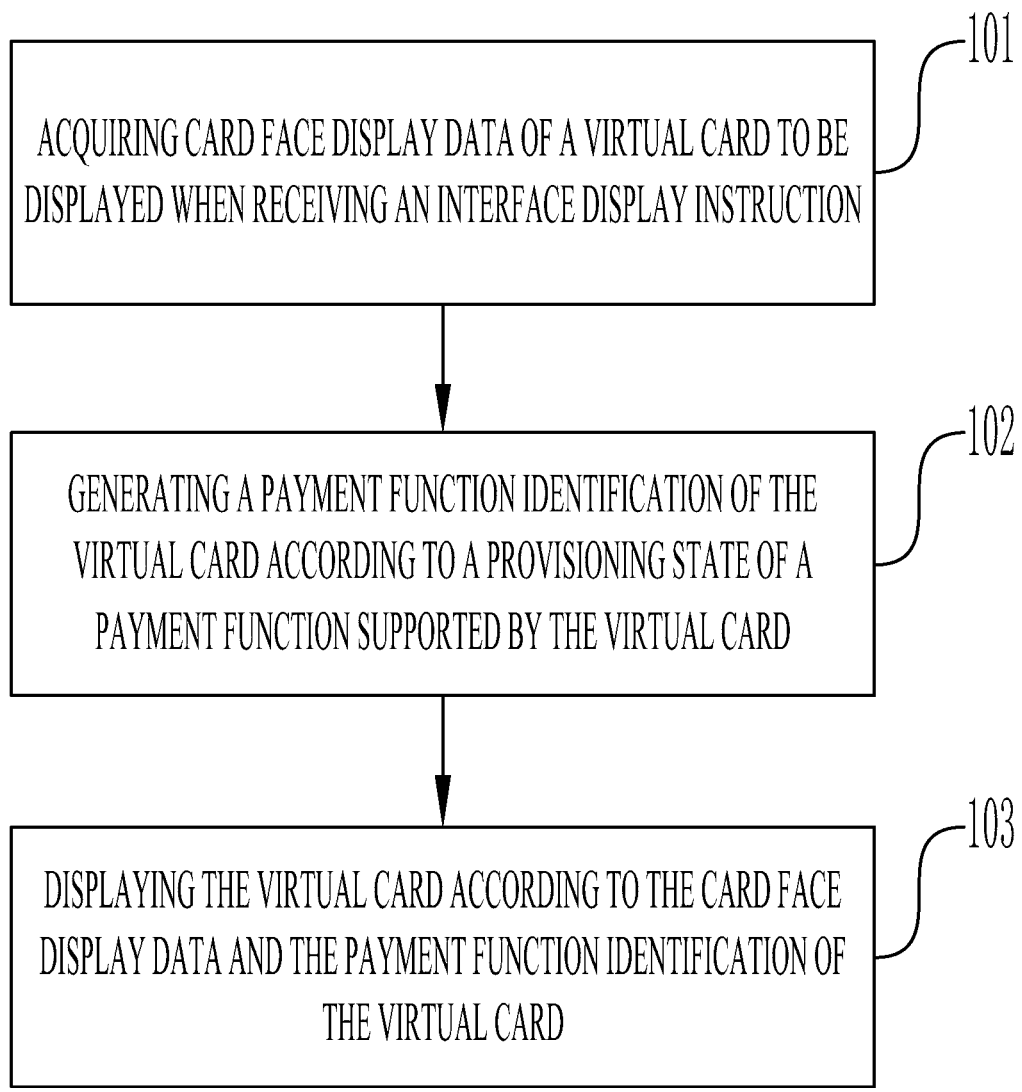
FIG. 1 is a flowchart showing a virtual card displaying method according to one or more embodiments.

FIG. 1 is a flowchart setting forth steps of a process for displaying a virtual card, in accordance with aspects of the present disclosure, is shown. The process may be carried out by a variety of suitable devices and terminals, as described in the present disclosure. In some implementations, the process may be embodied in a program, firmware, software or instructions executable by a processor, the program, software, firmware or instructions being stored as in a memory, such as a non-transitory computer readable medium, or other data storage.

In step 101, card face display data associated with a virtual card is acquired when an interface display instruction is received. To this end, step 101 may also include a step of receiving an interface display instruction from a user, or elsewhere. The card face display data may be acquired from a database or other storage location, and include a variety of information, including various card identifiers, illustrations, and so on. In step 102, a payment function identification is generated according to a provisioning state of a payment function supported by the virtual card. Then, in step 103, the virtual card is displayed according to the card face display data and the payment function identification.

Using this process, one or more virtual cards can be displayed, allowing for intuitive presentation of different payment functions supported by various cards and different provisioning states of the respective payment functions. In this manner, a user can be conveniently helped and guided to apply for provisioning of corresponding payment functions.

Figure 2:
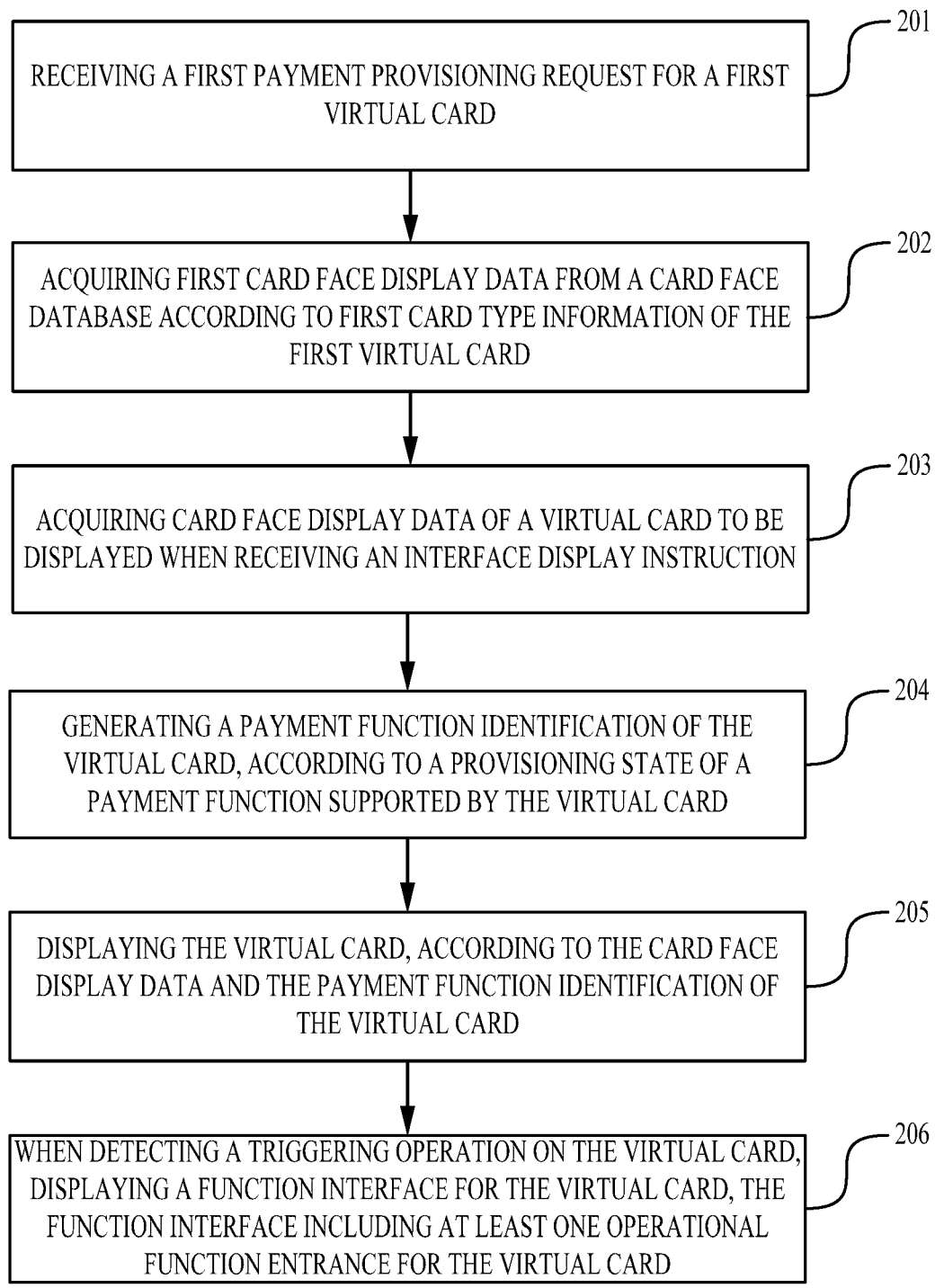
FIG. 2 is a flowchart showing another virtual card displaying method according to one or more embodiments.

Referring now to FIG. 2, a flowchart setting forth steps of a process for displaying a virtual card, in accordance with aspects of the present disclosure, is shown. Similarly, this process may be carried out by a variety of suitable devices and terminals, as described in the present disclosure, and be implemented in a program, software, firmware, and so forth.

The process may begin in step 201 with receiving a first payment provisioning request for a first virtual card. The first virtual card may refer to a current virtual card selected by a user. According to the above-described process of step 201, if a user wants to apply for provisioning of a third-party payment function for the virtual card, he/she may trigger a first payment provisioning request in a payment application. In practice, before triggering the first payment provisioning request, the user may also input a card number of the virtual card into the device or terminal, so that the card number can be accessed as necessary for provisioning of the first payment function.

In step 202, first card face display data is acquired from a card face database according to first card type information of the first virtual card. In some aspects, the first card face display data is card face display data corresponding to the first card type information. The card face database may include card type information and corresponding card face display data, along with other information. As an example, card type information may include preset digits of a card number associated with the first virtual card, such as the first four digits, the first six digits or first eight digits of the card number. Other combinations of digits may also be utilized.

It is recognized herein that the first digits of a bank card number can represent an issuing bank identification number, also known as a BIN number, and different BIN numbers may be used to distinguish different bank card organizations and card levels. Therefore, an issuing bank (for example, Industrial and Commercial Bank of China, China Merchants Bank or the like) of a virtual card, a card level (such as a gold card, a silver card, a platinum card or the like) and a bank card organization (e.g., UnionPay, VISA, Master, etc.) can be determined by acquiring a preset number of first digits of the virtual card number. In addition, a card face design may also be associated with or indicate card information including an issuing bank, a card level, a bank card organization, so the card type information may also serve for indexing or organizing card face display data.

In some aspects, card face display data stored in the card face database may be accessed during a process of provisioning the second payment function, as well as during other processes. For a virtual card supporting the second payment function, such as a NFC flash payment function, card face display data, including card face design and other information, provided by a bank or a bank card organization is acquired in the process of provisioning the payment function. Thus, when the data is displayed, a vivid and intuitive card face displaying effect can be provided. Further, a consistent displaying effect can be achieved by displaying in a shared manner existing card face designs on virtual cards supporting the first payment function.

The card face database may be a database maintained by a server, and the process of acquiring the card face display data may be realized through interaction with such server. For example, a terminal sends the first card type information to the server. When receiving the first card type information, the server queries whether the card face database stores first card face display data. The first card face display data is then acquired if the first card face display data is stored, and sends the acquired first card face display data to the terminal for displaying. Alternatively, the card face database may also be a database downloaded by the device or terminal from the server or another storage location. This reduces interactions between the device terminal and the server, allowing processes, such as acquiring card face designs, to be performed locally.

The above steps 201 and 202 constitute a process of acquiring card face display data while provisioning of a payment function. In one implementation, the process may be performed with the first payment function for the first virtual card being newly provisioned. In another implementation, a card face design of an existing virtual card on the terminal may be updated. That is, if a card face database is updated with second card face display information corresponding to second card type information, it is judged whether a number of existing local virtual cards include a second virtual card corresponding to the second card type information. If the number of existing local virtual cards include the second virtual card corresponding to the second card type information, the second card face display data is then acquired from the updated card face database.

For some virtual cards only certain payment functions may be supported at a particular time. However, if a bank or institution subsequently provisions other payment functions for the card, the server may notified and enabled to update the card face database. Accordingly, a card face updating may be triggered on the terminal by updating of the card face database. In some aspects, the process may also be such that, for a certain virtual card of which the card face design has not been stored in the server yet, the server timely notifies the terminal to perform updating if it detects that the card face design has been uploaded by another terminal. As such, the second card face display data may be shared with other virtual cards having the same card type as the second virtual card. Of course, updates to the card face database need not be executed specifically during the above process, and may be carried out at other times.

In some aspects, the card face display data of the virtual card may be stored in a designated storage area of the device or terminal, allowing for improved security. As such, the storage area may be a storage area of high security, such as a trustable storage area, which will not be specifically limited by embodiments of the present disclosure.

Referring again to FIG. 2, card face display data of a virtual card to be displayed is acquired when an interface display instruction is received, as shown in step 203. Based on the interface display instruction, a virtual card list interface may be displayed showing at least one virtual card which has been added to the device or terminal. In some aspects, if the terminal stores card face display data and card face type information in correspondence to each other, card face display data corresponding to card face type information may be accessed from the designated storage area of the terminal, according to the card face type information of the virtual card to be displayed. In some implementations, a terminal may assign a card identification (e.g., a card ID or a card serial number) to each virtual card, with the card identification and the card face display data being stored in correspondence with each other. As such, card face display data corresponding to the card identification may be acquired from the designated storage area of the terminal according to the card identification for the virtual card to be displayed.

In some implementations, after acquiring the first card face display data of the first virtual card, the first virtual card can be displayed during execution of step 203. At the same time, other virtual cards which have been added to the terminal can also be displayed. For each virtual card, the specific manner of display may be the same or different.

In step 204, a payment function identification for the virtual card is generated according to a provisioning state of a payment function supported by the virtual card.

For respective virtual cards, different payment function identifications may be generated according to different payment functions supported by the virtual cards as well as according to different provisioning states of the payment functions. Specific examples thereof are given as follows.

Figure 3:
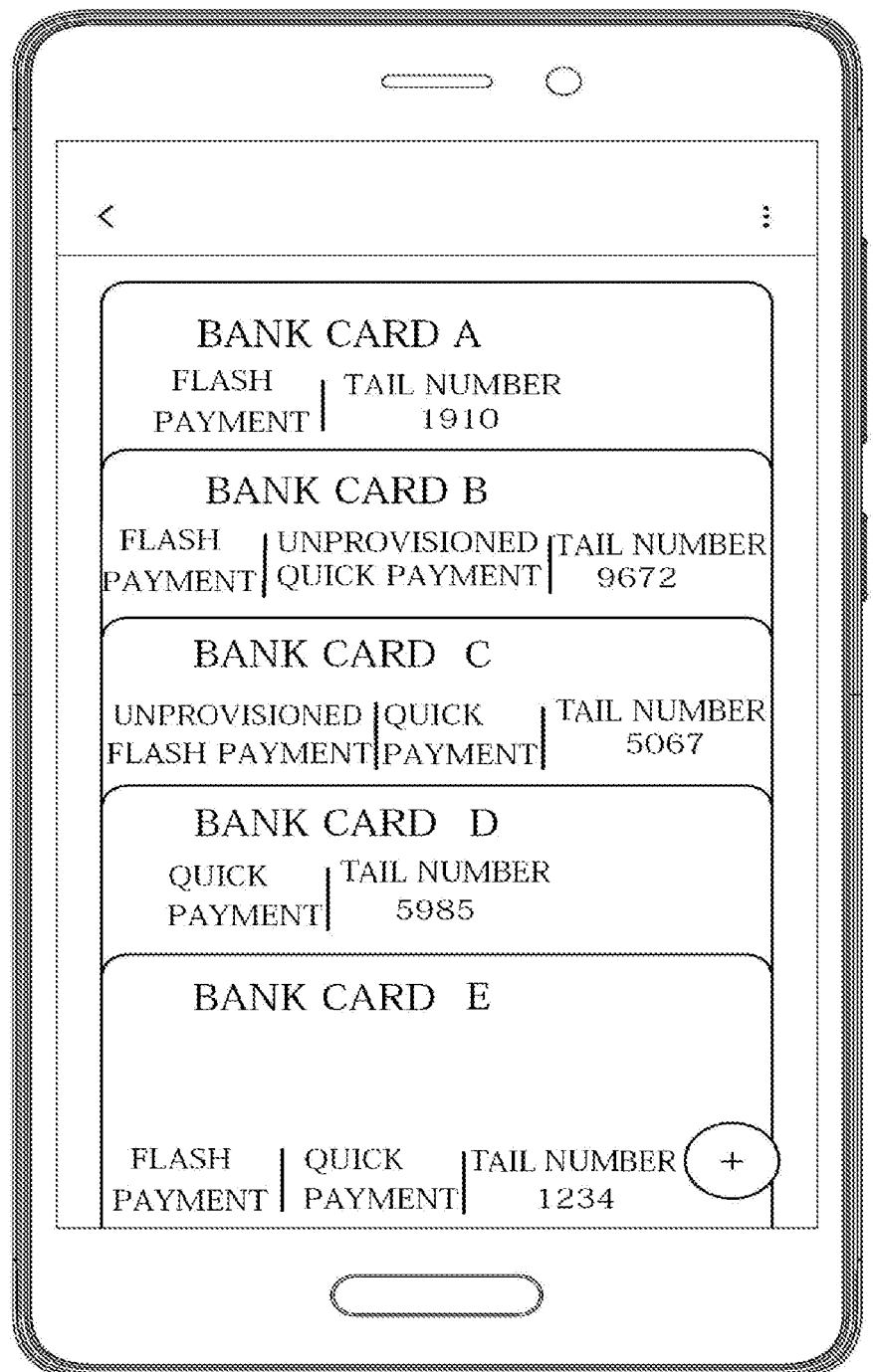
FIG. 3 shows a display interface of a virtual card according to one or more embodiments.

(1) If a virtual card supports the first payment function and the second payment function, which are both in a provisioned state, payment function identifications indicating a provisioned first payment function identification and a provisioned second payment function identification may be displayed, as shown on the card labeled bank card E in the example of FIG. 3.

(2) If a virtual card supports the first payment function, which is in a provisioned state and the second payment function, which is in an unprovisioned state, payment function identifications indicating a provisioned first payment function identification and an unprovisioned second payment function identification may be displayed, as shown on the card labeled bank card C in FIG. 3.

(3) If a virtual card supports the first payment function, which is in an unprovisioned state and the second payment function, which is in a provisioned state, payment function identifications indicating an unprovisioned first payment function identification and a provisioned second payment function identification may be displayed, as shown on the card labeled bank card B in FIG. 3.

(4) If a virtual card supports the first payment function, which is in a provisioned state, a payment function identification indicating a provisioned first payment function identification may be displayed, as shown on the card labeled bank card D in FIG. 3.

(5) If a virtual card supports the second payment function, which is in a provisioned state, a payment function identification indicating a provisioned second payment function identification, as shown on the card labeled bank card A in FIG. 3.

Referring again to FIG. 2, in step 205, the virtual card is displayed according to the card face display data and the payment function identification for the virtual card.

Displaying payment function identifications on a virtual card, in accordance with the present disclosure, can intuitively reflect payment function provisioning states of the virtual card. Moreover, based on the various provisioning states, a user can be intuitively prompted to apply for provisioning of functions or the like. Each virtual card can be displayed based on the payment function identifications generated in the above step 205 according to different payment functions supported by the virtual card and different provisioning states of the respective payment functions. For specific displaying manners, reference can be made to example bank cards shown in FIG. 3. It should be noted that these are mere examples, and specific contents of payment function identifications, displaying manners and locations of the identifications on card faces may vary, as well as other information, may vary.

In some implementations, a part of card type information of a virtual card may also be displayed on the virtual card to provide more intuitive card information. For example, the last four digits of a card or account number of a bank card may be displayed, as well as other information. In some aspects, when multiple virtual cards are to be displayed, these may organized as list of overlapping cards. For example, if a lower and an upper card are to be displayed, a part of the lower virtual card can cover a part of the upper virtual card, such that a payment function identification for the upper virtual card remains visible. Referring specifically to the bank cards A and B shown in FIG. 3, the bank card B at the lower position covers the lower part of the bank card A at the upper position, so that a payment function identification "Flash Payment" and a tail number "1910" of the bank card A can be displayed. In this format, the space required for displaying may be greatly saved. Other formats, including tile formats, and variations thereof, may also be utilized.

In step 206, when a triggering operation on the virtual card is detected, a function interface for the virtual card is displayed, wherein the function interface includes at least one operational function entrance for the virtual card.

When a user selects a virtual card from the virtual card list, either using buttons, touchscreen or voice activated commands, a current interface associated with the selected card may be displayed. The current interface may display various operational function entrances including an account inquiry function entrance, a credit card repayment entrance, a service network inquiry entrance, a user-defined card face pattern, preferential information or recommendation information of a financial institution, and so on. In some implementations, an operational function entrance may include a payment function provisioning entrance guiding a user to apply for provisioning of a payment function not currently provisioned for the virtual card. In this manner, the operation procedure can be simplified, and prompts can be given specifically for some operational functions. For example, if the first payment function is provisioned but the second payment function is not provisioned, an operational function entrance for provisioning the second payment function may be displayed. In some implementations, an operational function entrance for the virtual card may include a default card setting entrance for guiding the user to set a default payment card for a current payment function. For example, if the second payment function is provisioned, an operational function entrance for setting the default card may be displayed.

Figure 4:
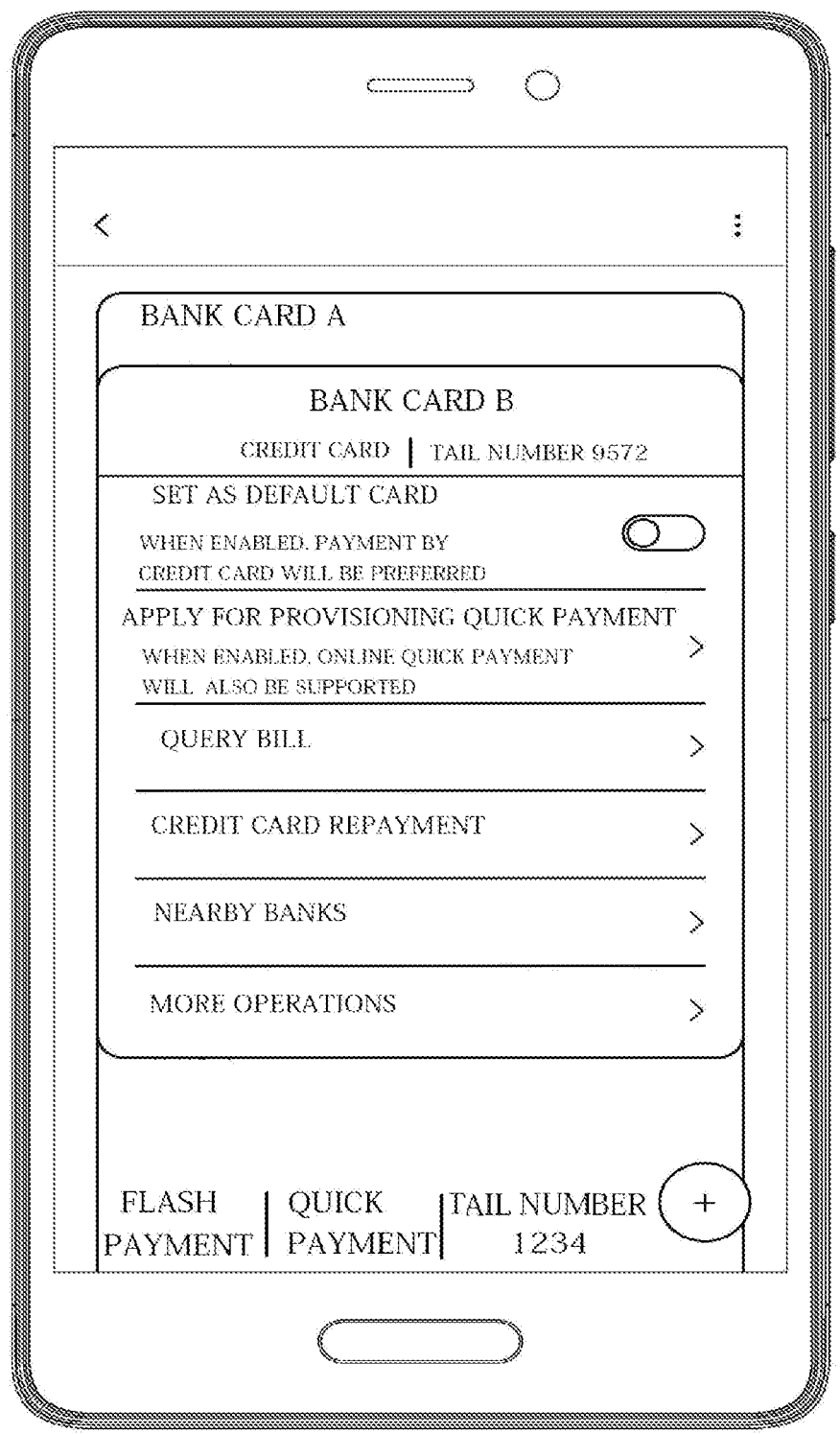
FIG. 4 shows a display interface of a virtual card according to one or more embodiments.
Figure 5:
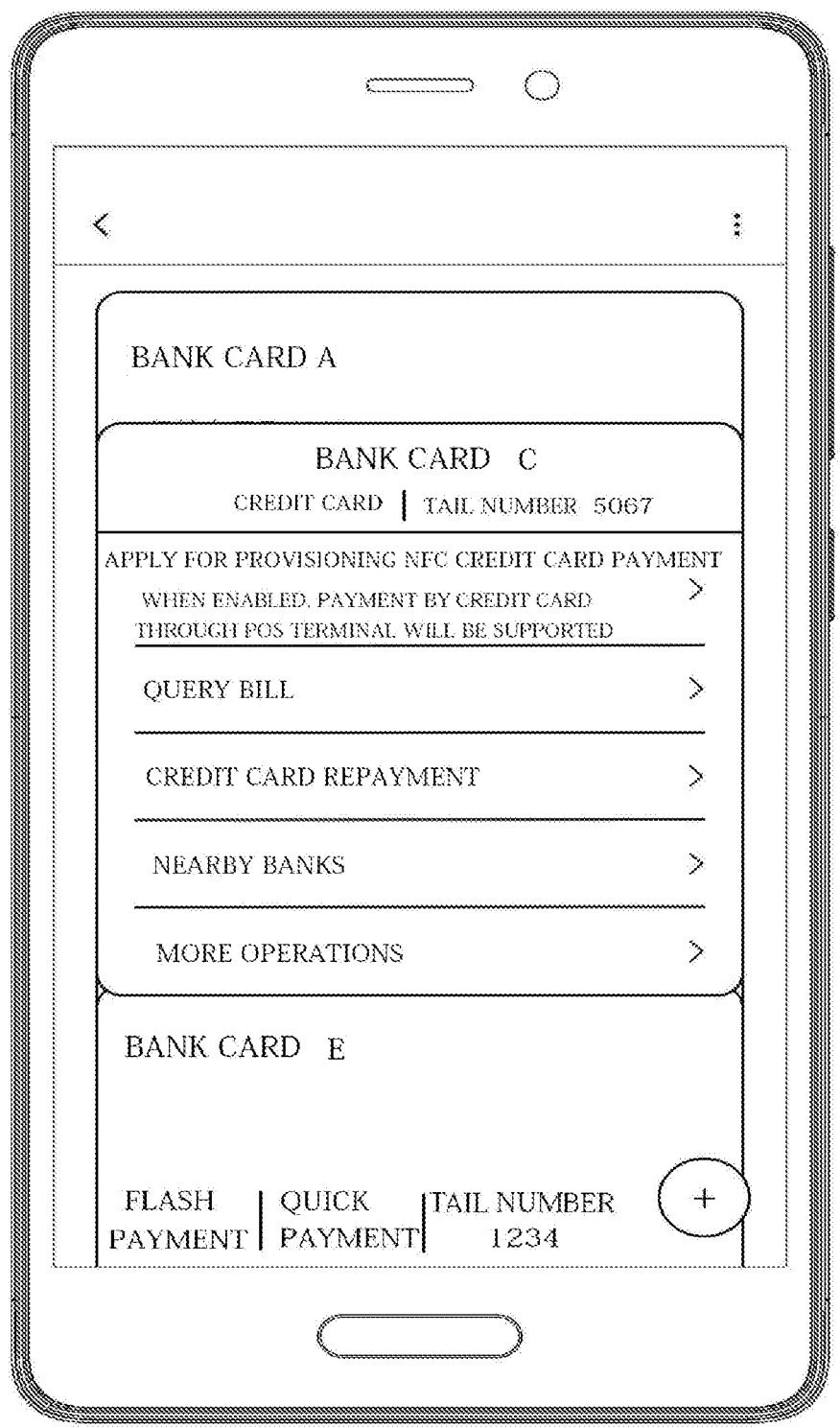
FIG. 5 shows a display interface of a virtual card according to one or more embodiments.

In order to provide a prompt to a user, when operational function entrances are displayed, the following principle may be followed. First, if the second payment function for the virtual card is provisioned, the operational function entrance for setting the default card may be displayed at the top of the at least one operational function entrance for the virtual card, as shown by the displaying order in FIG. 4. Second, if the first payment function is provisioned but the second payment function is not provisioned for the virtual card, the operational function entrance for provisioning the second payment function may be displayed at the top of the at least one operational function entrance, as shown by the displaying order in FIG. 5. Third, if the second payment function is provisioned but the first payment function is not provisioned for the virtual card, the operational function entrance for provisioning the first payment function may be displayed next below the operational function entrance for setting the default card, as indicated by the displaying order in FIG. 4. It should be noted that there are other orders for displaying the operational function entrances. FIGS. 4 and 4 only show an example of a possible displaying order, and are indeed non-limiting.

Using methods according to this disclosure, virtual cards may be displayed intuitively according to different payment functions supported by the virtual card and different provisioning states of the respective payment functions, so that all payment manners supported by the virtual card are clearly displayed. Thus, a user can be helped and guided to apply for provisioning of corresponding payment functions conveniently and consistently. Furthermore, card face designs acquired via a payment function may be shared with other payment functions of the same type of cards, so that intuitiveness and vividness of displaying the virtual cards can be greatly improved. Because a linked bank card supporting third-party quick payment reuses the card face design for NFC flash payment, for instance, a displayed card face may correspond to that of a real card emitted by the bank, so that the identifiability of the bank card can be greatly improved. Of course, a user-defined or personalized card face pattern may also be provided to meet further requirements on personalization and identifiability.

In some aspects, multiple payment functions may be managed. For example, these functions may include adding, deleting, setting a default card, provisioning guidance, other card-related O2O value-added service entrances, user-defining a card face pattern and the like. Meanwhile, operational function entrances for different payment functions on the same bank card may be recommended on a function interface as well, allowing for an integration of these, and other, functions.

It should be understood by those skilled in the art that, all or part of the steps of the above embodiments may be implemented through hardware or through programs that instruct related hardware. The programs may be stored in a computer-readable storage medium which may be a read-only memory, a magnetic disk, an optical disk and the like.

Figure 6:
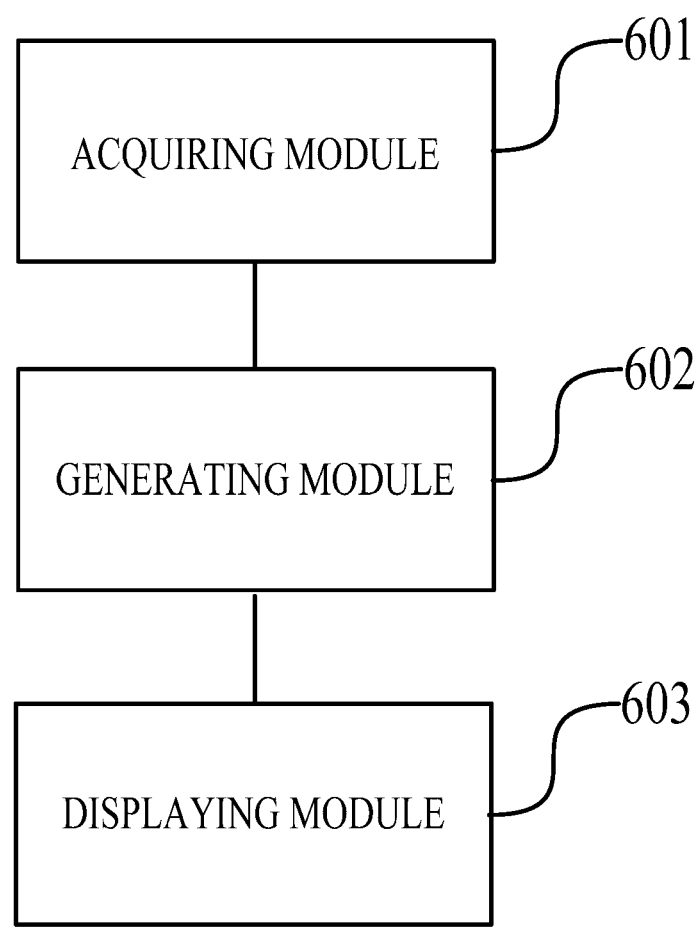
FIG. 6 is a schematic diagram of a virtual card displaying apparatus according to one or more embodiments.

FIG. 6 is a schematic diagram of a virtual card displaying apparatus according to an exemplary embodiment. As shown in FIG. 6, the apparatus may include an acquiring module 601 configured to acquire card face display data of a virtual card to be displayed when an interface display instruction is received. The apparatus may also include a generating module 602 configured to generate a payment function identification of the virtual card according to a provisioning state of a payment function supported by the virtual card. The apparatus may further include a displaying module 603 configured to display the virtual card according to the card face display data and the payment function identification of the virtual card.

In a possible implementation, the apparatus may further include a receiving module configured to receive a first payment provisioning request for a first virtual card which at least supports a first payment function. The acquiring module may be further configured to acquire first card face display data from a card face database according to first card type information of the first virtual card, wherein the card face database stores card face display data acquired during a process of provisioning a second payment function, and the first card face display data is card face display data corresponding to the first card type information.

In a possible implementation, the apparatus may further include a judging module configured to, when a card face database is updated with second card face display data corresponding to second card type information, judge whether a number of existing local virtual cards include a second virtual card corresponding to the second card type information. The acquiring module may be further configured to, if the number of existing local virtual cards include the second virtual card corresponding to the second card type information, acquire the second card face display data from the updated card face database.

In a possible implementation, the acquiring module may be further configured to acquire third card face display data and third card type information of a third virtual card during a process of provisioning the second payment function for the third virtual card. As such, the apparatus may further include an updating module configured to update the third card face display data and the third card type information of the third virtual card to a card face database. In a possible implementation, the updating module may be configured to send the third card face display data and the third card type information of the third virtual card to a server so that the server stores the same in the card face database In a possible implementation, the displaying module may be further configured to, when a triggering operation on the virtual card is detected, display a function interface for the virtual card, the function interface including at least one operational function entrance for the virtual card. Also, the acquiring module may be configured to send the first card type information of the first virtual card to a server so that the server queries the first card face display data from the card face database and returns the same, and receive the first card face display data.

In a possible implementation, operational function entrances for respective virtual cards may include one or more default card setting entrances for guiding a user to set default payment cards for current payment functions. Operational function entrances may also include at least one of an account inquiry function entrance, a credit card repayment entrance, a service network inquiry entrance, a user-defined card face pattern, and preferential information or recommendation information of a financial institution. Operational function entrances may also include payment function provisioning entrances for guiding a user to apply for provisioning of payment functions not currently provisioned for selected virtual card.

Figure 7:
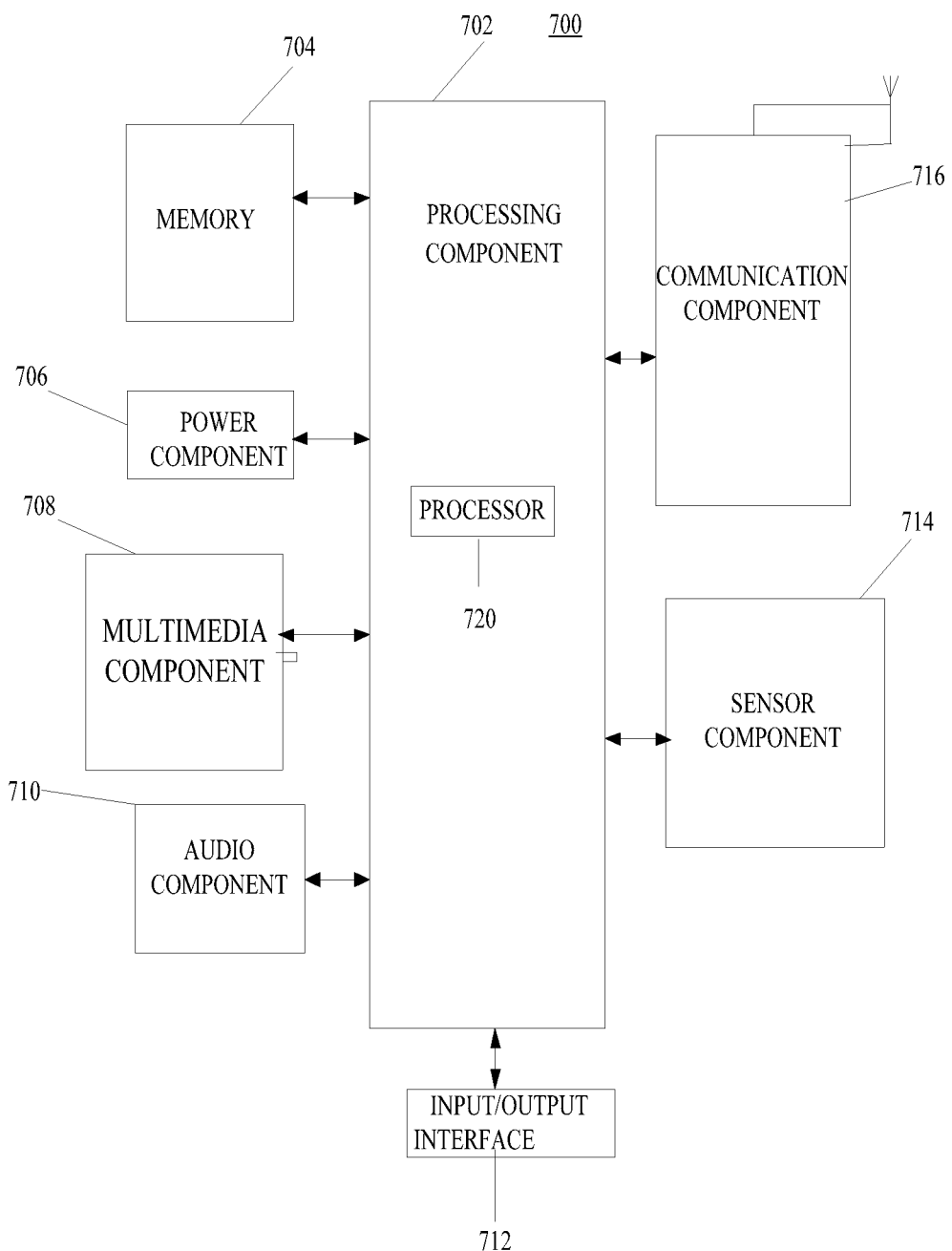
FIG. 7 is a block diagram of a virtual card displaying apparatus 700 according to one or more embodiments.

FIG. 7 is a block diagram of a virtual card displaying apparatus 700 in accordance with aspects of the present disclosure. For example, the apparatus 700 may be a mobile phone, a computer, a digital broadcast terminal, a message transceiver device, a game console, a tablet device, a medical device, fitness equipment, a personal digital assistant and the like. As shown, the apparatus 700 may include one or more following components: a processing component 702, a memory 704, a power component 706, a multimedia component 708, an audio component 710, an input/output (I/O) interface 712, a sensor component 714 and a communication component 716.

The processing component 702 typically controls overall operations of the apparatus 700, such as the operations associated with display, telephone calls, data communications, camera operations and recording operations. The processing component 702 may include one or more processors 720 to execute instructions to perform all or part of the steps in the above described methods. Moreover, the processing component 702 may include one or more modules which facilitate the interaction between the processing component 702 and other components. For example, the processing component 702 may comprise a multimedia module to facilitate the interaction between the multimedia component 708 and the processing component 702.

The memory 704 is configured to store various types of data to support the operation of the apparatus 700. Examples of such data comprise instructions for any applications or methods operated on the apparatus 700, contact data, phonebook data, messages, pictures, video, etc. The memory 704 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may comprise a power management system, one or more power sources, and any other components associated with the generation, management, and distribution of power in the apparatus 700.

The multimedia component 708 comprises a screen providing an output interface between the apparatus 700 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like.

The buttons may include, but are not limited to, a home button, a volume button, a starting button, and a locking button.

The sensor component 714 comprises one or more sensors to provide status assessments of various aspects of the apparatus 700. For instance, the sensor component 714 may detect an open/closed status of the apparatus 700, relative positioning of components, e.g., the display and the keypad, of the apparatus 700, a change in position of the apparatus 700 or a component of the apparatus 700, presence or absence of user's contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor or a temperature sensor.

The communication component 716 is configured to facilitate communication, wired or wirelessly, between the apparatus 700 and other devices. The apparatus 700 can access a wireless network based on a communication standard, such as WiFi, 2G, or 3G or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods. The apparatus 700 may use the circuitries in combination with the other hardware or software components for performing the above described methods. Each module, sub-module, unit, or sub-unit disclosed above may be implemented at least partially using the one or more circuitries.

In an exemplary embodiment, there is also provided a non-transitory computer-readable storage medium comprising instructions, such as comprised in the memory 704, executable by the processor 720 in the apparatus 700, for performing the above-described methods. For example, the non-transitory computer-readable storage medium may be a ROM, a RAM, a CD-ROM, a magnetic tape, a floppy disc, an optical data storage device or the like.

In some aspects, a non-transitory computer-readable storage medium is provided having stored therein instructions that, when executed by a processor of a device or terminal, causes the device or terminal to perform the steps of displaying virtual cards, as described with reference to FIG. 1 and FIG. 2, as well as other functions.

Figure 8:
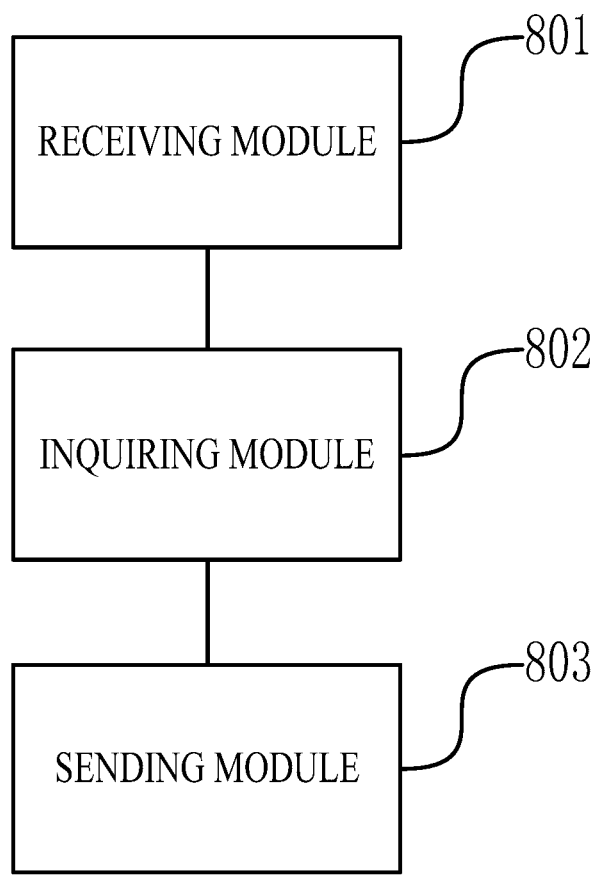
FIG. 8 is a schematic diagram of a virtual card displaying apparatus according to one or more embodiments.

FIG. 8 is a schematic diagram of a virtual card displaying apparatus according to another exemplary embodiment. As shown in FIG. 8, the apparatus may include a receiving module 801 configured to receive first card type information of a first virtual card sent by a terminal, the first virtual card at least supporting a first payment function. The apparatus also includes an inquiring module 802 configured to inquire whether a card face database stores first card face display data, wherein the card face database stores card face display data acquired during a process of provisioning a second payment function, and the first card face display data is card face display data corresponding to the first card type information. The apparatus further includes sending module 803 configured to send the first card face display data to the terminal if the card face database stores the first card face display data, so that the terminal displays the first virtual card according to the first card face display data.

In a possible implementation, the receiving module 801 may be further configured to receive third card face display data and third card type information of a third virtual card sent by the terminal. As such, the apparatus may further include a storing module configured to store the third card face display data and the third card type information of the third virtual card in the card face database.

Figure 9:
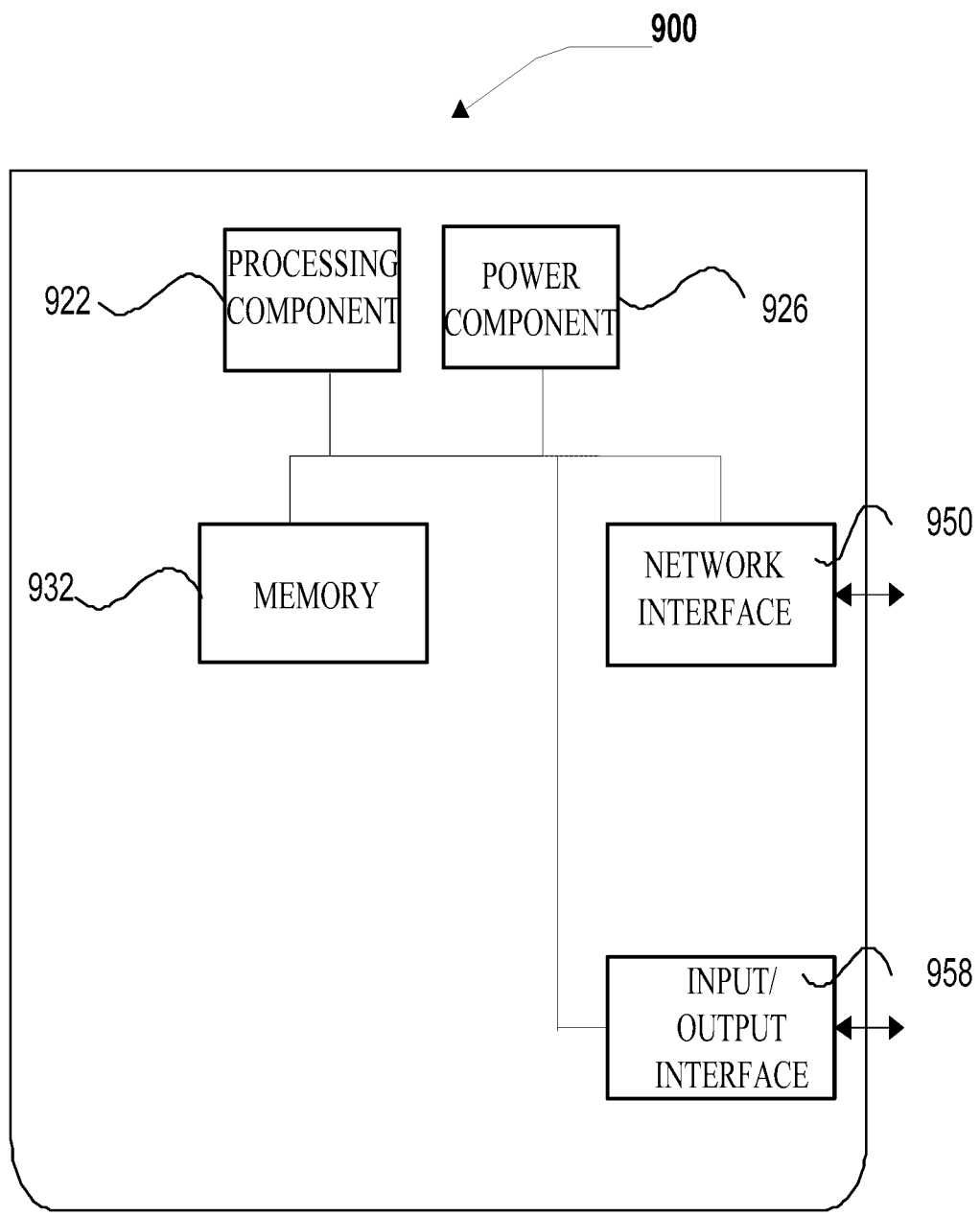
FIG. 9 is a block diagram of a virtual card displaying apparatus 900 according to one or more embodiments.

FIG. 9 is a block diagram of a virtual card displaying apparatus 900 according to another exemplary embodiment. For example, the apparatus 900 may be provided as a server, or a part thereof. Referring to FIG. 9, the apparatus 900 may include a processing component 922 having one or more processors, and memory resources represented by a memory 932. The memory 932 may store instructions executable by the processing component 922, such as applications, software, and other programs. In particular, applications stored in the memory 932 may include one or more modules, each corresponding to a set of instructions. In addition, the processing component 922 may be configured to execute instructions to perform methods in accordance with the present disclosure.

The apparatus 900 may also include a power component 926 configured to perform power management for the apparatus 900, a wired or wireless network interfaces 950 configured to connect the apparatus 900 to a network, and an input/output interfaces 958. The apparatus 900 may operate an operating system stored in the memory 932, such as Windows Server™, Mac OS X™, Unix™, Linux™, FreeBSD™ or the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. The specification and examples are intended to be exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for displaying a virtual card, the method comprising:
    receiving an interface display instruction;
    acquiring first card face display data for a virtual card to be displayed based on the interface display instruction;
    generating a plurality of payment function identifications for the virtual card according to a provisioning state of a plurality of payment functions supported by the virtual card, wherein the payment functions represented by the payment function identifications include a near-field communication (NFC) payment function and a third-party payment function of the virtual card;
    and displaying the virtual card according to the first card face display data and the plurality of payment function identifications for the virtual card, wherein the displaying includes displaying the payment function identifications for the plurality of payment functions supported by the virtual card, displaying indications of a provisioned state for each of the plurality of payment functions supported by the virtual card and currently provisioned on the virtual card, and displaying indications reflective of an unprovisioned state for each of the plurality of payment functions that are supported by the virtual card but not currently provisioned on the virtual card.

2. The method according to claim 1, further comprising:
    receiving a first payment provisioning request for a first virtual card;
    wherein the acquiring of the first card face display data is from a card face database of a server, and wherein the acquiring of the first card face display data from the card face database of the server is according to a first card type information of the first virtual card;
    and storing, by the server in the card face database, the first card face display data, wherein the first card face display data was acquired by the server during a process of provisioning a second payment function, and the first card face display data is card face display data corresponding to the first card type information.

3. The method according to claim 1, further comprising:
    judging whether a number of existing local virtual cards include a second virtual card corresponding to second card type information when the card face database is updated with second card face display data corresponding to second card type information;
    and acquiring the second card face display data from the updated card face database if the number of existing local virtual cards include the second virtual card corresponding to the second card type information.

4. The method according to claim 1, further comprising:
    acquiring third card face display data and third card type information of a third virtual card during a process of provisioning the second payment function for the third virtual card;
    and updating the third card face display data and the third card type information of the third virtual card.

5. The method according to claim 4, wherein the method further comprises sending the updated third card face display data and the updated third card face type information of the third virtual card to a server, and storing, by the server, the same in the card face database.

6. The method according to claim 1, the method further comprises displaying a function interface for the virtual card, when detecting a triggering operation on the virtual card, the function interface including at least one operational function entrance for the virtual card.

7. The method according to claim 6, wherein the at least one operational function entrance for the virtual card comprises a payment function provisioning entrance for guiding a user to apply for provisioning of a payment function not currently provisioned for the virtual card.

8. The method according to claim 6, wherein the at least one operational function entrance for the virtual card comprises a default card setting entrance for guiding a user to set a card as a default payment card.

9. The method according to claim 6, wherein the at least one operational function entrance for the virtual card comprises at least one of an account inquiry function entrance, a credit card repayment entrance, a service network inquiry entrance, a user-defined card face pattern, preferential information and recommendation information of a financial institution.

10. The method according to claim 1, wherein the method further comprises displaying, with the virtual card that is displayed according to the first card face display data and the plurality of payment function identifications, multiple virtual cards portions of which are overlapped such that the plurality of payment function identifications remain visible.

11. The method according to claim 2, wherein the method further comprises sending the first card type information of the first virtual card to a server, so that the server queries the first card face display data from the card face database and returns the same.

12. An apparatus for displaying virtual cards, the apparatus comprising:
    a processor;
    and a memory configured to store instructions executable by the processor, wherein the processor is configured to:
    acquire first card type information of a first virtual card which supports a plurality of payment functions;
    send the first card type information to a server, so that the server acquires, from a card face database of the server, first card face display data and returns the first card face display data, wherein the card face display data is acquired during a process of provisioning on the first virtual card a second payment function, and the first card face display data is card face display data corresponding to the first card type information;

receive the first card face display data;

generate a plurality of payment function identifications for the virtual card according to a provisioning state of the plurality of payment functions supported by the virtual card, wherein the payment functions represented by the payment function identifications include a near-field communication (NFC) payment function and a third-party payment function of the virtual card;

and display the first virtual card according to the first card face display data and the plurality of payment function identifications for the virtual card, wherein the displaying includes displaying the payment function identifications for the plurality of payment functions supported by the virtual card, displaying indications of a provisioned state for each of the plurality of payment functions supported by the virtual card and currently provisioned on the virtual card, and displaying indications reflective of an unprovisioned state for each of the plurality of payment functions that are supported by the virtual card but not currently provisioned on the virtual card.

13. The apparatus according to claim 12, wherein the processor is further configured to:

receive a first payment provisioning request for the first virtual card.

14. The apparatus according to claim 12, wherein the processor is further configured to:

when the card face database is updated with second card face display data corresponding to second card type information, judge whether a number of existing local virtual cards include a second virtual card corresponding to the second card type information;

and if the number of existing local virtual cards include the second virtual card corresponding to the second card type information, acquire the second card face display data from the updated card face database.

15. The apparatus according to claim 12, wherein the processor is further configured to:

acquire third card face display data and third card type information of a third virtual card during a process of provisioning the second payment function for the third virtual card:

and update the third card face display data and the third card type information of the third virtual card.

16. The apparatus according to claim 15, wherein updating the third card face display data and the third card face type information of the third virtual card to the card face database comprises sending the updated third card face display data and the updated third card type information of the third virtual card to a server so that the server stores the same in the card face database.

17. The apparatus according to claim 12, wherein the processor is further configured to:

after displaying the virtual card according to the first card face display data and the plurality of payment function identifications for the virtual card, when detecting a triggering operation on the virtual card, display a function interface for the virtual card, the function interface including at least one operational function entrance for the virtual card.

18. The apparatus according to claim 17, wherein the at least one operational function entrance for the virtual card comprises a payment function provisioning entrance for guiding a user to apply for provisioning of a payment function not currently provisioned for the virtual card.

19. The apparatus according to claim 17, wherein the at least one operational function entrance for the virtual card comprises a default card setting entrance for guiding a user to card as a set a default payment card.

20. A non-transitory computer-readable storage medium having stored therein instructions that, when executed by a processor of a device or terminal, causes the processor to perform a method comprising:

receiving an interface display instruction;

acquiring card face display data of a virtual card to be displayed based on the interface display instruction;

generating a plurality of payment function identifications for the virtual card according to a provisioning state of a plurality of payment functions supported by the virtual card, wherein the payment functions represented by the payment function identifications include a near-field communication (NFC) payment function and a third-party payment function of the virtual card;

and displaying the virtual card according to the card face display data and the plurality of payment function identifications for the virtual card, wherein the displaying includes displaying the payment function identifications for the plurality of payment functions supported by the virtual card, displaying indications of a provisioned state for each of the plurality of payment functions supported by the virtual card and currently provisioned on the virtual card, and displaying indications reflective of an unprovisioned state for each of the plurality of payment functions that are supported by the virtual card but not currently provisioned on the virtual card.

* * * * *